Sept. 23, 1969           G. R. MILLER           3,468,437
SYSTEM FOR HANDLING CARGO CONTAINERS
Filed Aug. 14, 1968           4 Sheets-Sheet 1
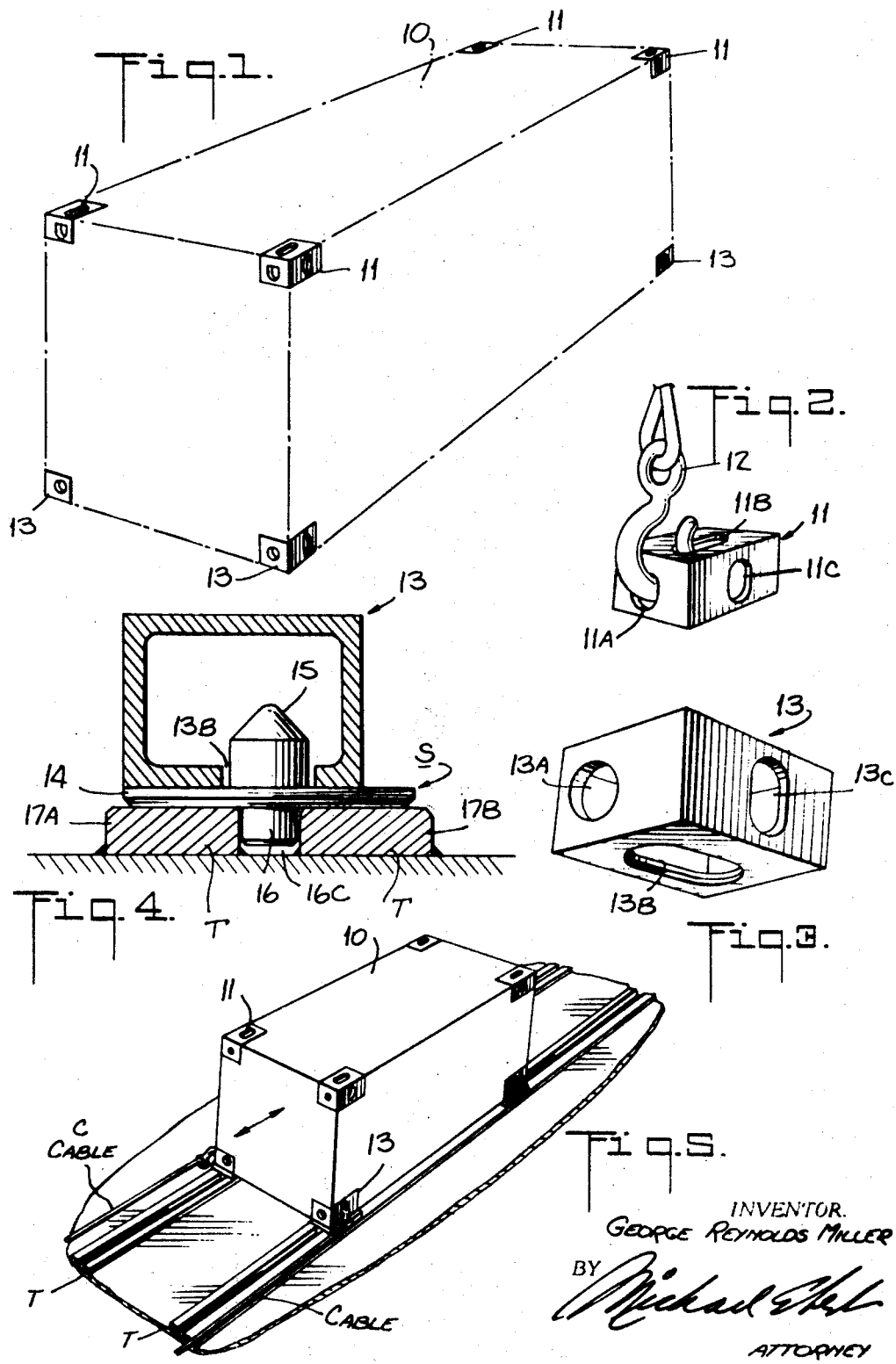
INVENTOR.
GEORGE REYNOLDS MILLER
BY
ATTORNEY Sept. 23, 1969　　　G. R. MILLER　　　3,468,437
SYSTEM FOR HANDLING CARGO CONTAINERS
Filed Aug. 14, 1968　　　　　　　　　　4 Sheets-Sheet 2

INVENTOR.
GEORGE REYNOLDS MILLER
BY
ATTORNEY

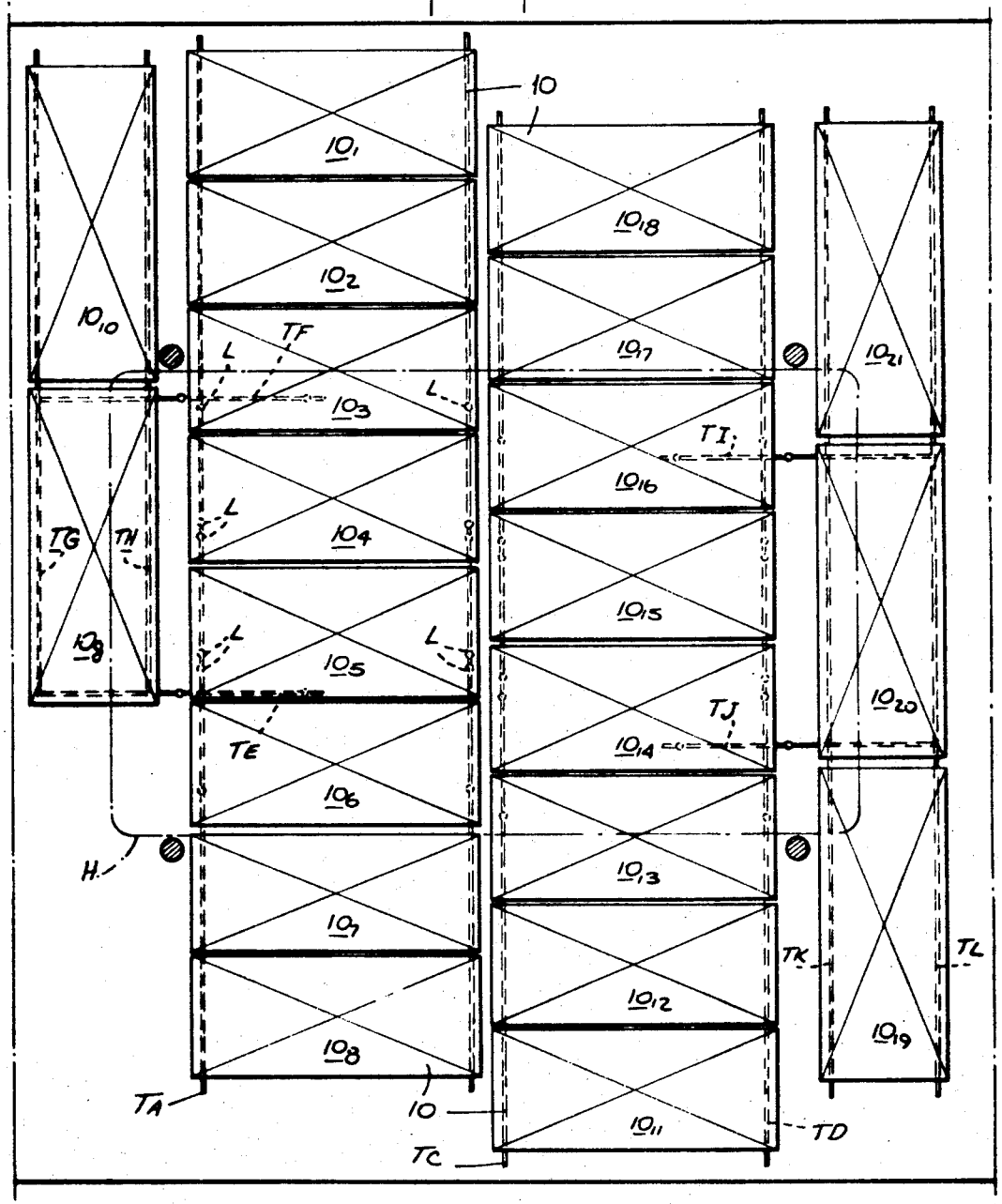

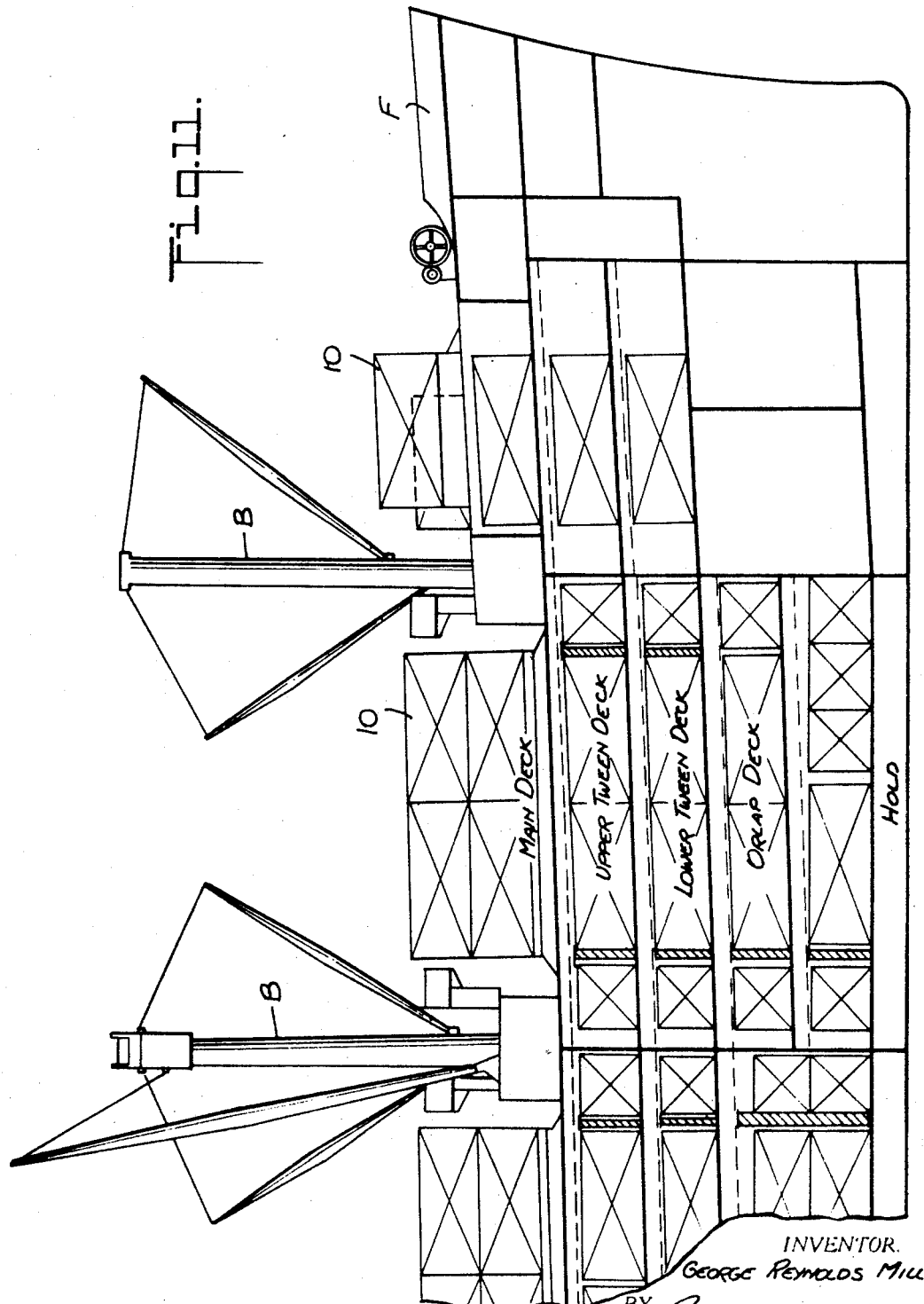

United States Patent Office 3,468,437
Patented Sept. 23, 1969

3,468,437
SYSTEM FOR HANDLING CARGO CONTAINERS
George Reynolds Miller, Highlands, N.J., assignor to American Export Isbrandtsen Lines, Inc., New York, N.Y., a corporation of New York
Filed Aug. 14, 1968, Ser. No. 752,688
Int. Cl. B63b 27/00
U.S. Cl. 214—15                                    10 Claims

ABSTRACT OF THE DISCLOSURE

A system for handling standard cargo containers making it possible to stow such containers in freighters and other vessels lacking cellular compartments for this purpose, the system including slide fixtures and rails. The slide fixture is formed by a skid plate having a top crown which is receivable in the base hole of a bottom corner fitting of the container, and a follower plug which projects into the channel of a track. By coupling four such slide fixtures to the bottom corner fittings of a container, one may slide the container along a trackway to desired locations in the vessel.

---

This invention relates generally to techniques for handling standard demountable cargo containers, and more particularly to a system of slide fixtures and rails which makes it possible for freighters and other vessels not designed to stow standard containers to accommodate such containers.

Increasing use is being made in the United States and in highly developed foreign countries of the containership concept. A containership is designed to receive and transport hundreds of standardized demountable cargo containers which may be quickly loaded on or discharged from a vessel, thereby effecting significant economies in time and in cargo handling costs. Huge trailers are now available for transporting such cargo containers to and from docking facilities, over superhighways and turnpikes, thus providing a fully integrated mode of transportation.

Essential to the containership concept is the cargo container which is a shipping box suitable for storing and transporting bulk material, packages and pieces, as well as a number of smaller containers, the cargo container protecting the contents thereof from loss or damage and being large enough to entail mechanical handling. A cargo container is said to be demountable when it can be handled in transit as a unit and when it can be mounted and secured in or on marine, rail, highway or air carriers.

Demountable cargo containers have been standardized as to their height and width, but they may vary in length. Thus standard containers are eight feet in width and eight feet in height, whereas their length lies modularly in the range of 10 to 40 feet. But for containerships, cargo containers have been standardized in 20 feet lengths (20' x 8' x 8'). Such containers are of rugged constructions, for they must have sufficient structural strength to withstand, without permanent deformation, the static and dynamic loads imposed by pick-up and stacking operations and the impact shock and stresses encountered in normal carrier service.

Demountable standard cargo containers are provided with top corner fittings having end, side and top openings adapted to accept standard hooks, shackles, slings or other engaging hardware elements for registering, picking up and securing containers on railroad flatcars, highway vehicles, ship's decks and hatches, as well as in aircraft. The bottom corners are also provided with fittings, these having end, side and bottom openings suitable for engagement with lifting devices as well as with registering and securing devices. In order to facilitate vertical stacking of the containers, the bottom corner fittings are made compatible with the top corner fittings.

In a containership, cells are provided which are adapted to accommodate standard containers, the cellular arrangement being such as to make full use of the space available in the vessel. But only a small proportion of vessels currently in use are containerships. Most cargo handling vessels were constructed well before the containership concept came into being and are of conventional design. Cargo vessels or freighters employed in shipping are designed to handle a large volume of cargo in the form of crates, packages and other bulk objects varying in size, shape and weight rather than standardized packages or containers. Such ships have an upper or weather deck and a hold, between which are a series of so-called "tween" decks. To facilitate loading and unloading, the decks are provided with vertically aligned hatch openings through which cargo may be raised or lowered, usually by the ship's boom. The hatches are closed by means of beams or pontoons placed thereacross.

While in a freighter it is possible to lower standardized containers through the hatches with available equipment, one cannot however then displace these containers, which may weigh several tons, away from the hatch area in order to stow them under the wings or in whatever cargo space is available. Hence it has not heretofore been feasible to make use of ordinary freighters for shipping standard cargo containers.

Accordingly, it is the main object of the present invention to provide a system adapted to convert a conventional cargo vessel or freighter so that it can effectively function as a container ship despite the absence of special cells therein. Thus the invention makes it possible to expand container operations far beyond present limits and to draft into container service many ships, never intended or designed for this purpose. On the other hand, the system does not require a basic modification or alteration in freighter design. Consequently a freighter equipped in accordance with the invention to handle standardized containers is still capable of service as a conventional cargo vessel.

More specifically it is an object of this invention to provide a system of the above type wherein slide fixtures are coupled to the bottom corner fittings of the container, the fixtures being slidable on rails, whereby the container may be lowered through a hatch opening onto the rails and then drawn there along to a desired location in the vessel. While the invention will be described in connection with the handling of containers in vessels, it will be recognized that the system is also useful at container loading stations as well as in warehouses and in other facilities in which containers are employed.

Briefly stated, these objects are accomplished by means of a slide fixture having a skid plate which rides on the top of a rail having a longitudinal channel, the plate having a follower plug on the underside thereof which is received in said channel and a crown on the top side thereof which projects within the base hole of the bottom corner fitting of the container, such that by coupling four such slide fixtures to the four bottom corner fittings, one may slide the container on the rails. A rail network is provided by which one can shift containers in various directions determined by the rail configuration.

For a better understanding of the invention as well as other objects and features thereof, reference is made to the following detailed description to be read in conjunction with the accompanying drawing wherein:

FIG. 1 is a perspective view of a standard demountable cargo container;

FIG. 2 separately shows one of the top corner fittings of the container;

FIG. 3 separately shows one of the bottom corner fittings of the container;

FIG. 4 is a sectional view of the slide fixture in accordance with the invention coupled to a bottom corner fitting.

FIG. 5 shows a container fitted with slide fixtures and running on a trackway;

FIG. 10 is a typical track layout; and

FIG. 11 shows a portion of a freighter which incorporates the system in accordance with the invention and is arranged to stow containers.

Figure 6:
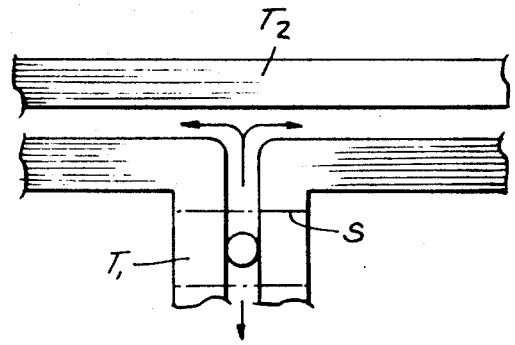
FIG. 6 illustrates a T connection track arrangement.

Referring now to FIG. 1, there is shown a standard demountable cargo container, generally designated by numeral 10. At the upper corners of the container are four top corner fittings 11, each fitting having end, top and side openings 11A, 11B and 11C, respectively, as shown separately in FIG. 2. These openings are differently shaped and are adapted to accommodate hooks (such as hook 12), shackles or other engaging pick-up devices.

At the bottom corners of the container, as shown separately in FIG. 3, are fittings 13 having the usual end, base and side openings 13A, 13B and 13C for use with engaging hardware. In stacking one container above the other, the bottom corner fittings of the higher container are coupled to the top corner fitting of the lower container by suitable stacking lugs to hold the containers together.

In order to slide the container along a trackway, a slide fixture S, as shown in FIG. 4, is coupled to each bottom corner fitting 13. The slide fixture S is constituted by a flat skid plate 14 having an upper peaked crown 15 and a lower follower plug 16. Skid plate 14 bridges a pair of spaced bars 17A and 17B forming a single track T, the space therebetween constituting a longitudinal channel 16C which receives follower plug 16 and acts to guide the skid plate.

Crown 15 projects within the base opening 13B of the bottom corner fitting. The base opening has an oval shape and the body of the crown has a similar shape so that the fixture is prevented from turning with respect to the container. Plug 16, however, is of cylindrical shape. By coupling four such slide fixtures S to the bottom corner fittings 13, as shown in FIG. 5, the container may thus be slid along a trackway formed by a pair of tracks T. Power for pulling the skid-mounted container along the trackway may be provided by tackles, winches and other available power means connected by cables C to hooks engaging the bottom corner fittings.

The direction of container movement is determined by the configuration of the track network. In order, for example, for a moving container to turn at right angles in either direction, a T type connection is provided as shown in FIG. 6, wherein a track section $T_1$ is joined to a track section $T_2$, perpendicular thereto, whereby the slide fixture S arriving at the junction of the two sections is free to travel in either direction on Track $T_2$.

Figure 7:
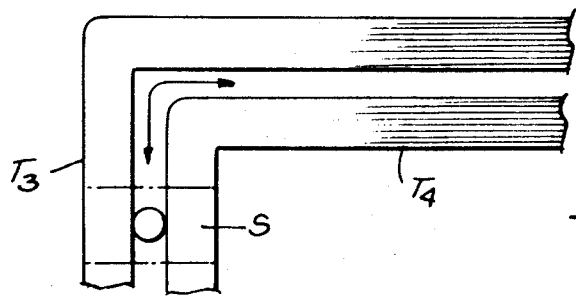
FIG. 7 illustrates an L connection track arrangement.
Figure 8:
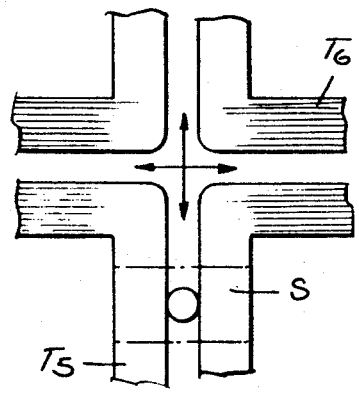
FIG. 8 shows a cross connection track arrangement.

In FIG. 7, there is shown an L connection, wherein track section $T_3$ joins track section $T_4$ and the slide fixture S at the junction can only turn to the right. In the cross-connection shown in FIG. 8 of track sections $T_5$ and $T_6$, the slide fixture S is free at the junction thereof to cotninue in the same direction or to turn left or right for continued movement. It will be seen that in FIGS. 6, 7 and 8, the corners of the channels at the junctions are chamfered to facilitate a change in direction for the rounded plugs running in the channel. In practice, the track connections may be at angles other than right angles. Also, rather than straight tracks, curved tracks may be provided where necessary.

Figure 9:
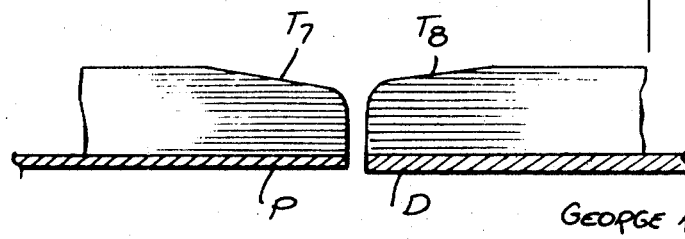
FIG. 9 shows the abutting ends of track sections when the track runs across a hatch platoon.

When a trackway runs over a hatch pontoon P onto the deck D as shown in FIG. 9, since the pontoon may not be perfectly level with the deck, it is necessary to make allowances for this fact. Thus the end of the track section $T_7$ on pontoon P is chamfered as is the adjacent end of track section $T_8$ on the deck, thereby avoiding a block or discontinuity in the path of the slide fixture.

Because of the follower plug arrangement, the slide fixtures are capable of traveling along tracks in any direction as guided by the channels and it becomes possible to move the skid-mounted containers endwise or broadside, whichever is more convenient under given circumstances.

Referring now to FIG. 10, there is shown, by way of example, a track network which is designed to make full use of space available in a deck area of a freighter. Access to the deck is through a generally rectangular hatch opening whose boundaries are outlined at H. Hence one can lower a container by a boom onto the deck within the hatch area and one can raise a container situated in this area. It will be seen, however, that there is a great deal of cargo space available in the region of the deck surrounding the boundaries of the hatch. The problem therefore in designing a track layout is to make it possible to shift various containers 10 to proper locations in this region. The track network shown in FIG. 10 is so designed.

Extending transversely with respect to the hatch opening from one side of the ship to the other are four parallel tracks TA, TB, TC and TD. Tracks TA and TB constitute a trackway and are spaced so as to accommodate the length of a container mounted on slide fixtures. The small circles L on trackway TA–TB within the boundaries of the hatch opening indicate loading points. Thus by bringing a container down on these loading points and coupling the slide fixtures thereto, one may then, by means of winches or other means capable of pulling the skid-mounted containers along the trackway, shift the containers so that they occupy the positions of containers 10 to $10_8$ as shown in FIG. 10.

However, before putting containers 10 to $10_8$ in place, it is necessary to fill the available spaces to the left thereof, which spaces are occupied by containers $10_9$ and $10_{10}$. For this purpose there are provided tracks TE and TF, forming a trackway running from loading points within the hatch boundaries in the aft direction to connect with a trackway formed by tracks TG and TH running toward the port.

Thus to put container $10_{10}$ in place, it is loaded on trackway TE–TF at the loading points thereon, and shifted broadside until it reaches the junction with trackway TG–TH, at which junction it is shifted endwise in the port direction until it occupies its proper position. Container $10_9$ is put in place simply by loading it onto trackway TE–TF and then shifting it until it is on the junction of trackway TG–TH, where it remains.

At the junction of track TE and TG there is an L connection, while at the junction of track TE and TH, there is a T connection and at the junction of track TE and TA there is a cross-connection. At the junction of track TF and TG there is a T connection, while at both the junction of track TG and TH and the junction of track TF and TA there are cross-connections.

Tracks TI and TJ form a trackway for broadside movement of containers $10_{11}$ to $10_{18}$, this trackway intersecting a trackway formed by tracks TK and TL, which are spaced for endwise movement of containers $10_{19}$ to $10_{21}$, the manner of shifting these containers being similar to that described in connection with the other trackways.

Thus by a network of rails or tracks one is able to fully utilize the available space on the deck and crowd containers one against the other in a limited area. In the event the deck height is sufficient, one may operate with coupled pairs of containers, each pair having containers stacked one above the other. Because of the corner fittings, once the containers are in place, they may be locked in position by suitable holding appliances and sway stoppers coupled to the fittings and anchored to the deck or rails. In practice the rails may be welded in place on the deck or be attached thereto by removable bolts, depending on whether a permanent or temporary installation is desired. The working surfaces of the rails and slide fixtures are polished or otherwise treated to reduce friction.

Referring now to FIG. 11, there is shown in sectional view a portion of a typical freighter F, in which a system in accordance with the invention is installed. It will be seen that the hold, or lop deck, lower tween deck, upper tween deck and main deck have containers 10 stored thereon in various broadside and endwise arrangements so as to fully occupy the available space. The containers are raised and lowered through the hatch openings by the ship's booms B, and are shifted into their assigned positions by slide fixtures running on a network of rails. It will be noted that the containers in this instance are in a single layer except on the main deck where they are in stacked pairs.

While there has been shown a preferred embodiment of the invention, it will be appreciated that many changes may be made therein without departing from the essential features of the invention as defined in the annexed claims. For example, instead of forming the tracks by a pair of spaced rails defining a channel therebetween, the tracks may be constituted by means having a longitudinal trough or channel formed therein.

What I claim is:

1. A skid-mounting system for handling standard cargo containers having top and bottom corner fittings, the bottom corner fittings having a base hole, said system comprising:
   (a) four slide fixtures coupled to the bottom corner fitting of each container, each fixture being constituted by a skid plate having a top crown which projects into the base hole of the associated bottom corner fitting to link said fixture thereto and a follower plug extending below said skid plate, and
   (b) a network of trackways for conveying the containers to various positions, each trackway being formed by a pair of tracks having longitudinal channels therein for receiving said follower plugs whereby said skid plates lie across the channel and are slidable along the tracks.

2. A system as set forth in claim 1, wherein each track is formed by a pair of spaced rails, the space therebetween defining said channel.

3. A system as set forth in claim 1, wherein said base hole has a non-circular shape and said crown has a similar cross-sectional form to prevent rotation of said skid plate with respect to the associated container.

4. A system as set forth in claim 3, wherein said shape is oval.

5. A system as set forth in claim 1, wherein the channels in a given trackway communicate at junctions with the channels in another trackway connected thereto.

6. A system as set forth in claim 5, wherein said trackway connection is in an L formation to permit a right turn in one direction.

7. A system as set forth in claim 5, wherein said trackway connection is in a T formation to permit a right turn in either direction.

8. A system as set forth in claim 5, wherein said trackway connection is in a cross-formation to permit continued movement in the same direction or a right turn in either direction.

9. A system for converting a freighter having several decks and hatch openings providing access to the decks into a containership capable of stowing and transporting standard cargo containers, said system being in accordance with the system set forth in claim 1, the network of trackways being secured to said deck to permit movement of said containers to positions displaced from the hatch openings.

10. A system as set forth in claim 9, wherein said freighter is provided with booms for lowering said containers through said hatch openings, and winches for moving said containers along said trackways.

References Cited

UNITED STATES PATENTS 2,469,575  5/1949  Ralston et al.
3,083,670  4/1963  Harlander et al. _ 214—10.5 XR GERALD M. FORLENZA, Primary Examiner F. E. WERNER, Assistant Examiner U.S. Cl. X.R.

104—134